United States Patent [19]

Yamaguchi et al.

[11] Patent Number: 5,010,722
[45] Date of Patent: Apr. 30, 1991

[54] ROTARY RING WINDING DEVICE

[75] Inventors: Hiroshi Yamaguchi, 9-7, Ooyamada 4-chome, Kuwana-shi, Mie; Masashi Yamaguchi, Osaka, both of Japan

[73] Assignees: Hiroshi Yamaguchi; Hiroshi Kimura, both of Japan

[21] Appl. No.: 511,943

[22] Filed: Apr. 16, 1990

Related U.S. Application Data

[63] Continuation of Ser. No. 402,346, Sep. 5, 1989, abandoned.

[30] Foreign Application Priority Data

Sep. 5, 1988 [JP] Japan .................. 63-223249

[51] Int. Cl.$^5$ ............ D01H 7/56; D01H 7/64
[52] U.S. Cl. ................ 57/124; 57/100; 57/122
[58] Field of Search ............ 57/75, 100, 101, 119, 57/120, 121, 122, 123, 124

[56] References Cited

U.S. PATENT DOCUMENTS

| | | | |
|---|---|---|---|
| 2,932,152 | 4/1960 | Jackson | 57/124 X |
| 3,114,234 | 12/1963 | Kobayashi et al. | 57/124 |
| 3,122,876 | 3/1964 | Matsui | 57/124 |
| 3,543,503 | 12/1970 | Watabe et al. | 57/75 |
| 3,785,140 | 1/1974 | Muller | 57/100 |
| 3,851,448 | 12/1974 | Sano et al. | 57/75 |

FOREIGN PATENT DOCUMENTS

| | | |
|---|---|---|
| 1185959 | 1/1965 | Fed. Rep. of Germany . |
| 1251192 | 9/1967 | Fed. Rep. of Germany . |
| 2337719 | 2/1975 | Fed. Rep. of Germany . |
| 2196405 | 3/1974 | France . |
| 534978 | 10/1955 | Italy .................. 57/124 |
| 544551 | 6/1956 | Italy .................. 57/124 |
| 5007656 | 3/1975 | Japan . |
| 929752 | 5/1982 | U.S.S.R. ........... 57/124 |
| 1217947 | 3/1986 | U.S.S.R. ........... 57/124 |

Primary Examiner—Joseph J. Hail, III
Assistant Examiner—William Stryjewski
Attorney, Agent, or Firm—Stevens, Davis, Miller & Mosher

[57] ABSTRACT

In an improved rotary ring winding device wherein a rotary ring member is rotatably supported by a bearing device secured to a ring rail, the bearing device is provided with a first annular magnetic member wherein an annular recess is formed. The rotary ring member is provided with a second annular magnetic member having an annular projected portion which is arranged in the annular recess of the first annular magnetic member with an air-gap therebetween. The first annular magnetic member is provided with at least an annular portion formed by an electric magnet, and the other portion of the first annular magnetic member and the second annular portion are formed by permanent magnets, wherein each annular portion of the first magnetic member and each annular portion of the second magnetic member, facing each other, are designed to have identical magnetic poles. Thus controlling the exciting current applied to the electric magnet, the rotary ring member can be rotatably supported in free condition by the bearing device, and a braking force can be applied on the free rotation of the rotary ring member by controlling the above-mentioned exciting current.

14 Claims, 4 Drawing Sheets

ROTARY RING WINDING DEVICE

This application is a continuation of application Ser. No. 402,346, filed Sept. 5, 1989 now abandoned.

1. FIELD OF THE INVENTION

The present invention relates to an improved rotary ring winding device utilized in the spinning of a yarn.

2. DESCRIPTION OF THE RELATED ART

With regard to the bearing supporting a rotary ring of the rotary ring winding device used in the spinning of a yarn, a bearing utilizing a slide ring provided with a sliding surface (cf. Japanese Examined Patent Publication Showa 54-15934), a bearing formed as a pneumatic bearing actuated by air jets (cf. Japanese Examined Patent Publication Showa 54-13528), and a bearing utilizing a ball bearing (cf. Japanese Unexamined Patent Publication Showa 56-68119) are well known in this field.

In these known bearing of the rotary ring winding devices, however, when a spindle is finally stopped after a gradual reduction of the rotating speed thereof by stopping the spinning frame, the rotary ring continues to rotate under its own inertia, due to the moment of inertia thereof. Thus the reduction of the rotating speed of the rotary ring is delayed as compared with the reduction of the rotating speed of the spindle, whereby an overrun of the rotary ring occurs, and accordingly, a snarl is created due to an unwinding of the yarn, and therefore, a yarn breakage occurs, because of this snarl, when the spinning frame is again driven.

To solve this problem caused by the creation of a snarl, several methods are known. These include: a stepped reduction of the rotation speed of the spindle so that the yarn tension of the spinning yarn and the torque of a traveller are reduced and the drive of the spinning frame is stopped after reducing the rotation speed of the rotary ring; or a simultaneous friction braking of all rotary rings of the spinning frame; or a simultaneous provision of a fluid resistance, by oil pressure or air pressure, to the rotation of all rotary rings of the spinning frame when all spindles of the spinning frame are simultaneously stopped. These methods are adopted to simultaneously stop all rotary rings in synchronization with the simultaneous stopping of all spindles when a doffing operation is to be carried out at the spindles.

As it is known in the art, a rotary ring able to rotate at a high speed, is currently required by the spinning industry, but since the rotation speed of the rotary ring is increased in accordance with an increase of the rotation speed of the corresponding spindle, the rotation speed of the rotary ring becomes equal to the maximum speed of a traveller during forming each chase, due to the moment of inertia. Accordingly, the characteristic control effect of the rotary ring, which is a relatively negative effect due to a transfer of variations of the yarn tension to the rotation torque by an absorbing of energy, the control of the yarn tension is eliminated, and accordingly, the reduction of the effect due to the variation of yarn tension is eliminated, because of the disturbance caused by the moment of inertia of the rotary ring. Namely, the yarn tension is repeatedly changed due to distinct variations of the winding speed of the yarn during forming each chase, and therefore, it is almost impossible to prevent the creation of a neppy yarn, fluffy yarn or weak yarn, and other low quality yarns, in the above-mentioned control system.

SUMMARY OF THE INVENTION

The object of the present invention is to provide an improved rotary ring winding device utilized for spinning a yarn, which device is capable of rotating a rotary ring member at a high speed and is able to prevent an overrun of the rotary ring member by controlling the rotation speed of the rotary ring member.

Therefore, to prevent the above-mentioned problems recognized in the known prior art, in the improved rotary ring winding device according to the present invention, the rotary ring member is rotatably supported by a bearing device, a first annular magnetic member and a second annular magnetic member are coaxially secured to the bearing device and the rotary ring member, respectively, horizontal to the axial center of the bearing device. A horizontal annular groove is formed in the first annual magnetic member and an annular projected portion is coaxially formed in the second annular magnetic member at a position facing the annular groove of the first annular magnetic member, and the annular projected portion of the second annular magnetic member is engaged in the annular groove of the first annular magnetic member in such a manner that a very small air gap is maintained between the inside wall of the annular groove of the first annular magnetic member and the outside surface of the above-mentioned annular projected portion of the second annular magnetic member. The first annular magnetic member comprises an upper annular portion positioned at a level higher than the annular projection of the second annular magnetic member and a lower portion positioned at a level lower than the above-mentioned annular projection, and at least one of the above-mentioned upper and lower annular portions of the first annular magnetic member is formed by an electric magnet, and the remaining portions of the first annular magnetic member and the second magnetic member are formed by permanent magnets, each pair of facing portions of the first annular magnetic member and the second annular magnetic member are designed to provide an identical pole, respectively, and the exciting current of the electric magnet of the first magnetic member is capable of maintaining the support of the rotary ring member by the bearing device, or creating a braking action on the free rotation of the rotary ring member.

Therefore, during normal spinning operation, the exciting current applied to the electric magnet is adjusted to maintain the air gap between the annular groove of the first annular magnetic member of the bearing device and the annular projected portion of the second annular magnetic member by creating a repelling force in the electric magnet against the annular projected portion of the second annular magnetic member so that the rotary ring member is supported by the bearing device in a freely balanced condition. On the other hand, if it is necessary to brake the rotation of the rotary ring member, the exciting current applied to the electric magnet is adjusted to upset the above-mentioned balance of the magnetic force between the electric magnet and the annular projected portion of the second annular magnetic member so that the annular projected portion of the second annular magnetic member comes into contact with the inside surface of the annular groove of the first magnetic member, and accordingly, a braking force is applied to the rotation of the rotary ring. Further, if it is necessary to apply a strong braking action on the rotation of the rotary ring member, the current direction of the exciting current applied to the electric magnet is intentionally reversed so that the annular projected portion of the second annular magnetic member is attracted to the electric magnet of the first annualr magnetic member, and accordingly, the rotary ring member can be stopped rapidly.

DESCRIPTION OF THE PREFERRED EMBODIMENTS

The construction and function of the improved rotary ring winding device supporting the rotary ring according to the present invention are hereinafter explained in detail with reference to the drawings of the embodiments of the present invention.

Figure 1:
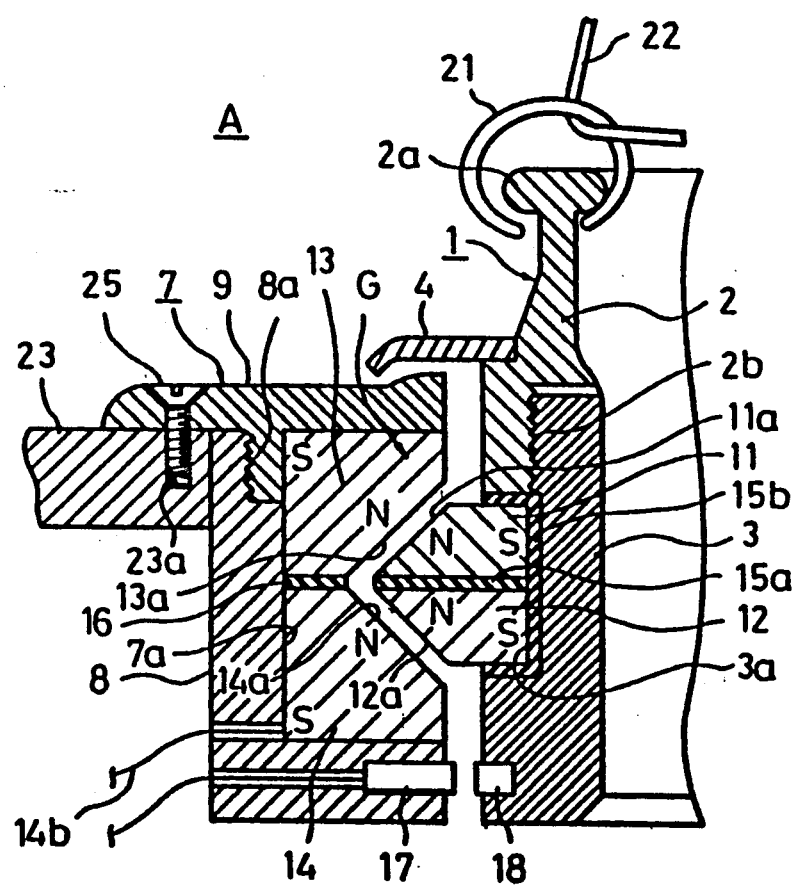
FIG. 1 is partial cutaway front sectional view of a principal embodiment of the improved rotary ring winding device supporting a rotary ring, according to the present invention.

The improved rotary ring winding device shown in FIG. 1 is a fundamental embodiment of the present invention, based upon the technical concept of the present invention, and thus the construction and function thereof will be first explained in detail.

In FIG. 1, a ring-shaped rotary ring member 1 comprises a flange rotor 2 provided with a ring flange portion 2a whereon a traveller 21 is able to slide, and a lower rotor 3, which is fixed to the flange rotor 2 by thread engagement at a portion 2b. The lower rotor 3 is made of a material such as an aluminum alloy, a copper alloy, a stainless steel, a metal material containing a non-magnetic element such as carbon, or a synthetic resin material, whereby a possible magnetization of the ring flange portion 2a and the traveller 21 is avoided.

The ring-shaped rotary member 1 is rotatably support by a bearing device G, and a holder 7, which secures the bearing device G at a desired position thereof to a ring rail 23, is fixed by a set screw 25 in an aperture 23a formed in the ring rail 23.

In this rotary ring winding device, a pair of annular permanent magnets 11 and 12 are fitted into a recessed groove 3a formed in the lower rotor 3 via respective spacers 15a and 15b. These permanent magnets 11 and 12 are provided with tapered surfaces 11a and 12a, respectively in such a manner that each tapered surface (11a, 12a) is formed at the tip outside surface in the radial direction thereof at an angle of substantially 45 degrees to the axis of the rotary ring member 1, and these tapered surfaces 11a and 12a are provided with a N pole magnetic field, respectively.

The spacer 15b is provided to prevent a leakage of the magnetic field of the permanent magnets 11 and 12 outside, particularly to the ring flange portion 2a and the traveller 21, to ensure that a normal spinning operation can be smoothly carried out.

The holder 7 is rigidly joined to a main body 8 of the holder 7 and a cover body 9 thereof, by a set screw, to form a rigid one-body structure.

An annular recessed portion 7a is formed in the holder 7, and an annular permanent magnet 13 and an annular electric magnet 14 are disposed therein with a ring shaped spacer 16 located therebetween.

The permanent magnet 13 and the electric magnet 14 are provided with tapered surfaces 13a and 14a respectively, at an inside circumferential surface thereof at an angle of 45 degrees to the axial center of the rotary ring member 1, and these tapered surfaces 13a and 14a face each other to form an annular recess having a V-shaped radial cross section, as shown in FIG. 1.

The pole of the tapered surface 13a has an N polarity, like the pole of the above-mentioned tapered surface 11a, and the pole of the tapered surface 14a of the electric magnet 14 also has an N polarity when an exciting current of the normal direction is applied to a lead wire 14b; however, the magnetic field of the pole of the electric magnet 14 can be changed by changing the current direction of the exciting current in reverse to the normal direction.

The permanent magnets 11, 12, 13 are made of a ferro-magnetic substance such as a metallic material, ferrite (oxide-ceramics), a rare earth, or a rubber or plastic material containing such a feromagnetic substance. Further, the permanent magnets 11, 12, 13 and the electric magnet 14 are covered or coated by a thin film or sheet, made of an oilless sliding material having low coefficient of friction, a high abrasion resistance, and a high heat resistance, such as ceramics, a tetrachloroethylene-resin film containing carbon fibers or other fillers, polyimide, polyimideamide, and other high polymer engineering plastics, if necessary. Accordingly, the surfaces of the pole portions of these magnets are protected.

The spacer 16 is provided to electrically isolate the electric magnet 14 from the permanent magnet 13.

A sensor 17 is disposed in the holder body 8, and the lower rotor 3 is provided an exciting member 18 which excites the sensor 17 so that a signal indicating passing the exciting member 18 through the sensing region of the sensor 17 is issued, accordingly the rotation speed of the ring-shaped rotor body 1 can be measured.

As shown in FIG. 1, a spinning yarn 22 running towards a bobbin (not shown) passes through the traveller 21 which is running along the annular flange 2a of the ring-shaped rotor body 1.

Next, the function of the above-mentioned rotary ring winding device is explained in detail.

An exciting current having a predetermined magnitude is applied to the annular electric magnet 14 through a lead wire 14b from a variable electric power source of an electric control circuit device (not shown), so that a magnetic pole having a magnitude identical to the magnetic pole of the tapered annular surface 13a of the permanent magnet 13 is created at the tapered annular surface 14a of the electric magnet 14. As already explained, polarities of these poles are identical. Accordingly, the tapered surfaces 11a and 13a repel the corresponding tapered surfaces 13a and 14a facing thereto, respectively, and thus the permanent magnets 11 and 12 are made to floated upward, i.e., the permanent magnets 11 and 12 are separated from the permanent magnet 13 and the electric magnet 14, respectively.

Accordingly, the ring-shaped rotary member 1 can be rotated by a very weak rotation torque, and since the energy loss due to friction is remarkably lowered, the ring-shaped rotary member 1 is rotated at a high speed by the rotational action of the traveller 21.

When the exciting current applied to the electric magnet 14 is reduced, the magnitude of the magnetic pole of the electric magnet 14 is lowered so that the force pulling the permanent magnets 11 and 12 upward is reduced. Accordingly, the rotary ring member 1 is displaced downwards under its own weight and the repulsion of the tapered surface 11a of the permanent magnet 11 by the tapered surface 13a of the permanent magnet 13 is weakened, and thus the tapered surface 12a of the permanent magnet 12 is forced into contact with the tapered surface 14a of the electric magnet 14. The contact pressure between these two tapered surfaces 12a and 14a can be adjusted by changing the amplitude of the exciting current applied to the electric magnet 14.

If the direction of the exciting current is changed to be the reverse of the normal direction, the pole of the tapered surface 14a of the electric magnet 14 has an S polarization, and thus the tapered surface 14a is attracted to the tapered surface 12a of the permanent magnet 12, and therefore, an effective and strong braking power can be obtained.

As mentioned above, the braking power between the rotor ring member 1 and the bearing device G can be controlled by controlling the current direction and the amplitude of the exciting current applied to the electric magnet 14, so as to control the rotation speed of the rotor ring member 1, and to control the time necessary for stopping the rotation of the rotary ring member 1 when rotating at a high speed.

Using the electric control circuit mentioned above, the rotation speed of the rotary ring member 1 is detected by a signal output from the sensor 17, so that the rotation speed of the rotary ring member 1 can be controlled to a predetermined speed, and when the drive of a spinning frame is stopped, the rotation speed of the rotary ring member 1 can be controlled such that the above-mentioned speed is reduced before the reduction of the rotation speed of each spindle (not shown). When the spindles are driven at a very high rotation speed, to prevent the occurrence of a phenomenon such that the rotation speed of the rotary ring member 1 becomes excessively high, the exciting current applied to the electric magnet 14 is controlled. For example, the rotation speed of the rotary ring member 1 is controlled to be always slower than the rotation speed of the spindles, by as much as 90% of the rotation speed of the spindles, to maintain the yarn tension in a suitable condition for carrying out the spinning operation at a high efficiency.

Further, even when it is necessary to rapidly stop the drive of the spindles, which are rotating at a high rotation speed, it is possible to stop the rotation of rotary ring member 1 before stopping the drive of the spindles, by changing the direction of the exciting current applied to the electric magnet 14, so that the permanent magnet 11 is attracted to the electric magnet 14 in the doward direction along the axial direction thereof.

As mentioned above, by utilizing the rotary ring winding device according to the present invention, the creation of a snarl due to rewinding can be prevented, and further, the spinning yarn tension can be effectively controlled during the spinning operation.

Further, since a centrifugal force due to the tapered surfaces 11a, 12a, 13a and 14a having an angle inclined to the axial center of the rotary ring member 1 is created, the rotary ring member 1 is maintained in a stable condition without vibration at the axial center thereof.

As a modification of the above-mentioned embodiment, the permanent magnets 11 and 12 may be constructed as one body, or the permanent magnets 11 and 12 may be constructed with the rotory ring member 1 as one body. In the above-mentioned embodiment the electric magnet 14 is positioned below the permanent magnet 13, but the above-mentioned arrangement may be reversed, and therefore, it is preferable to use two electric magnets instead of a combination of the permanent magnet 13 and the electric magnet 14.

In the above-mentioned embodiment, the polarity of the four magnets 11, 12, 13 and 14 is N, but the polarity of these four magnets may be changed to S, or the polarities of the upper magnets 11 and 13 may be different from the polarities of the lower magnets 12 and 14.

In another modification of the first embodiment, in which the permanent magnets 11, 12, 13 and the electric magnet 14 are provided with the respective taper surfaces 11a, 12a, 13a and 14a, magnets without such tapered surfaces are utilized.

In the above-mentioned embodiment, the flange rotor 2 is threadingly engaged with the lower rotor 3, but these two elements can be assembled by a pressure engagement.

Figure 2:
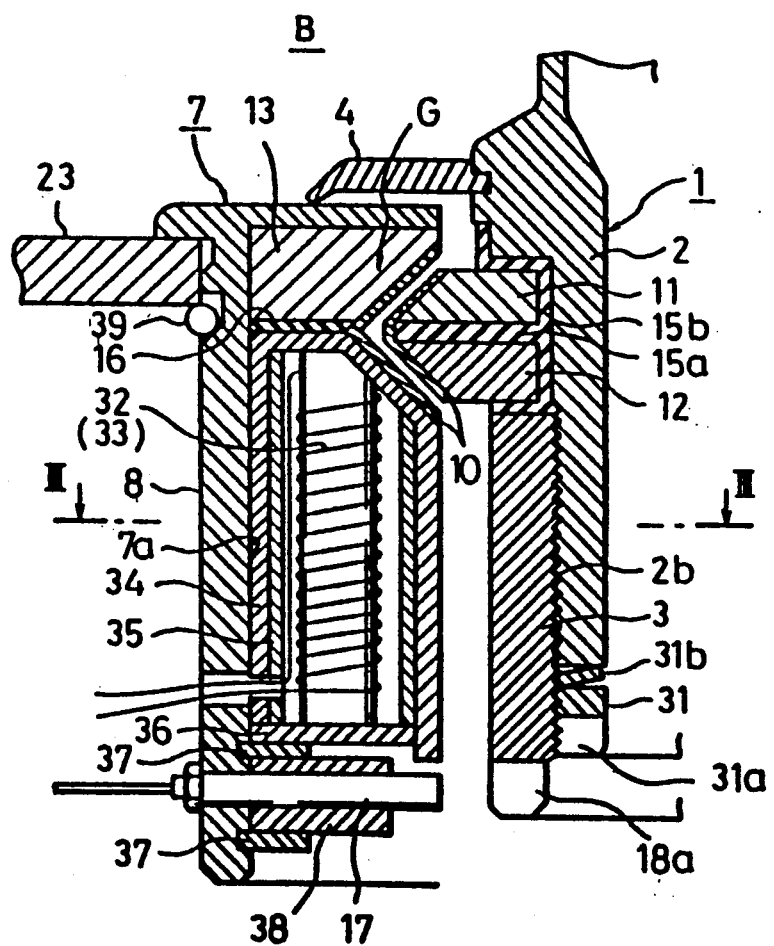
FIG. 2 is a partial cutaway front sectional view of another embodiment of the improved rotary ring winding device supporting a rotary ring, according to the present invention.
Figure 3:
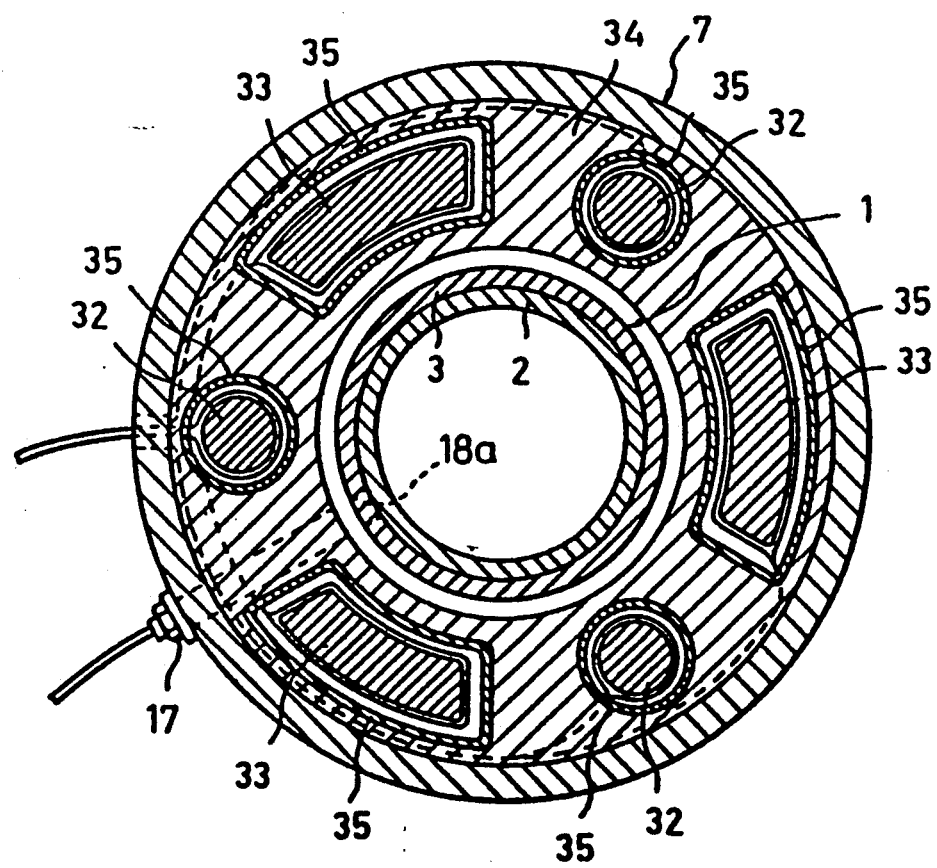
FIG. 3 is sectional view of the rotary ring winding device, taken along the line III—III of in FIG. 2; and, FIG. 4 is a partial cutaway sectional view of a modification of the rotary ring winding device shown in FIG. 2.

Next, another embodiment of the rotaring ring winding device according to the present invention is hereinafter explained with reference to FIGS. 2 and 3. In the following explanation, elements identical to those of the first embodiment are referred to by identical reference numerals, and therefore an explanation of such elements is omitted. In the embodiment shown in FIGS. 2 and 3, a rotary ring member 1 is formed by a flange rotor 2 and a lower rotor 3 threadingly engaged with the flange rotor 2 at a thread portion 2b, and the above-mentioned threaded engagement is fixed by a lock nut 31 provided with an engagement groove 31a, via a plate spring washer 31b. The lower rotor 3 is provided with a cutoff portion 18a, and a sensor 17 disposed in a holder 8 detects the cutoff portion 18a so that outputs signals in accordance with the number of rotations of the rotary ring member 1 can be issued.

A holder 7 is provided with a yoke case 34, and a plurality of apertures are formed in the yoke case 34 in such a manner that these apertures are arranged angularly spaced at identical intervals along a circle having a center which coincides with the axial center of the ring-shaped rotor body 1, and a plurality of waveguides 35 are engaged in the corresponding apertures, respectively. Electric magnets 32 having a cylindrical shape and provided with an electric coil wound around the main body thereof, and electric magnets 33 having a fan-shaped cross section and provided with an electric coil wound around the main body thereof, are alternately disposed in these apertures along the above-mentioned circle, and lead wires from these electric magnets 32 and 33 are led outside the bearing device G. As a result of the aforementioned spacing of the apertures and alternating positioning of the magnets and as clearly shown in FIG. 3, each intervening angular distance between two adjacent electric magnets 32,33 is identical. In FIG. 2, the reference numerals 10, 36, 37, 38, 39 indicate covers of the sliding portions, a bottom plate, an end ring, a stop ring, a spring clamp for fixing the holder 7, respectively. In the above-mentioned embodiment, the cross sections of the electric magnets 32 and 33 can be modified to be of identical shape.

The functions of the above-mentioned electric magnets 32, 33 are similar to that of electric magnet 14 of the first embodiment, but as it is possible to create a very strong magnetic pole at these electric magnets 32, 33, a very stable operation of the bearing device G can be obtained. Further, a very effective braking control by these electric magnets 32, 33 can be obtained by controlling the exciting current applied thereto.

Figure 4:
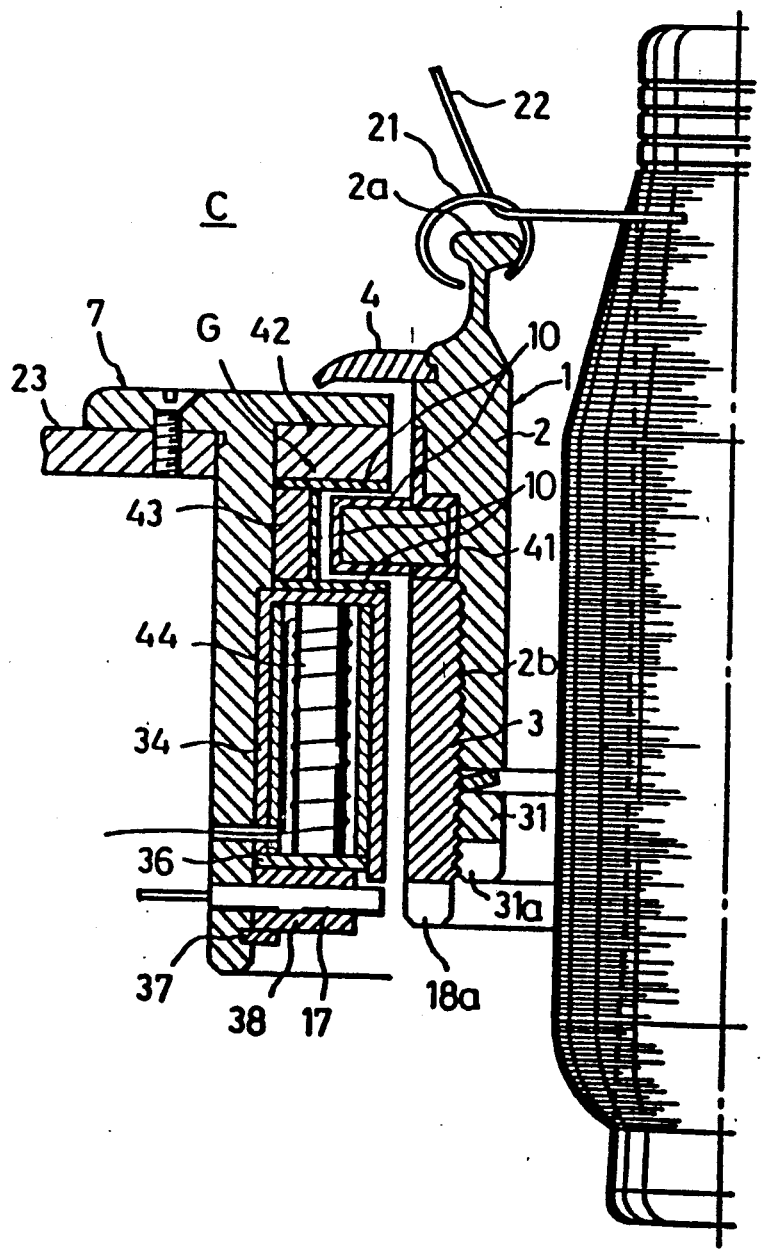

The following modification can be applied to the above-mentioned second embodiment, as to the first embodiment. Namely, the permanent magnets 11, 12 and 13 and the electric magnets 32, 33 are provided with tapered surfaces, respectively, but these magnets need not be designed to have such tapered surfaces, respectively. For example, as shown in FIG. 4, a permanent magnet 41, which corresponds to the combined body composed of the permanent magnets 11 and 12, is designed as an annular ring having a rectangular cross-section in the radial direction, permanent magnets 42, 43, which correspond to the permanent magnet 13, and an electric magnet 44, which corresponds to the electric magnets 32, 33, are designed in such a way that these magnets surround parts of the upper and lower portions, and a side portion, of the permanent magnet 41, as shown in FIG. 4.

As mentioned above, the principal technical concept of the present invention is explained in detail with reference to the described embodiments. According to the principle of their technical concept, a following method for controlling the rotation speed of the rotary ring member can be applied in the spinning industry. That is, an electric motor is provided with a rotor which concides with the above-mentioned rotary ring member 1, to form a synchronous motor whereby the rotary ring member 1 is directly driven, and the rotation speed of the rotary ring member 1 is controlled by adjusting the frequency or intensity of the drive current applied to the motor or the exciting current applied to the electric magnet 14.

As mentioned above, according to the present invention, it is possible to rotate the rotary ring member at a high speed while controlling the rotation speed thereof. Since the rotary ring member is floated by a magnetic force, energy loss due to, for example, friction, becomes negligible. Accordingly, the creation of a snarl due to rewinding, when the drive of a spindle is stopped, can be prevented, and the yarn tension of the spinning yarn can be controlled as required to ensure an effective spinning operation.

We claim:

1. An improvement in a ring winding device, which comprises a spindle, a ring rail able to be alternately displaced upward and downward along the axial direction of said spindle, a rotary ring member rotatably supported at said ring rail by a bearing device coaxially with said spindle, said rotary ring member being provided with a ring-shaped flange portion whereon a traveller for guiding a yarn can be slidably mounted, means for driving said spindle and means for displacing said ring rail, comprising:

a bearing device provided with a first annular magnetic member coaxially disposed therein and horizontal to an axial center thereof, and a rotary ring member provided with a second annular magnetic member coaxially disposed at an outside annular surface thereof at a position facing said first annular magnetic member, said first annular magnetic member being provided with a horizontal annular recess, and said second annular magnetic member being provided with a radially projected annular portion having a radial cross-section such that said projected portion can be engaged in said annular recess of said first magnetic member with an air-gap therebetween, said first annular magnetic member being divided into an upper annular portion and a lower annular portion with respect to said projected annular portion of said second annular magnetic member, at least one of said upper and lower annular portions of said first annular magnetic member being formed by an electric magnet, and the other portion of said first annular magnetic member and said second annular magnetic member being formed by permanent magnets respectively, said electric magnet of said first annular magnetic member being capable of controlling a magnetic action thereof by controlling an exciting current applied thereto, whereby said rotary ring member can be freely rotatably supported by said bearing by controlling said exciting current in the normal spinning operation, and a brake force can be applied to said free rotation of said rotary ring member by controlling said exciting current.

2. An improvement in a rotary ring winding device according to claim 1, wherein said electric magnet forms said lower portion of said first annular magnetic member of said bearing device, whereby said air gap between an inside annular wall of said annular recess formed in said first annular magnetic member and an outside surface of said projected annular portion of said second magnetic member can be maintained in a stable and uniform condition by creating a balance of repelling forces created between said electric magnet and said projected annular portion of said second annular magnetic member by applying a controlled exciting current to said electric magnet, and a braking force can be applied to said rotary ring member by controlling said exciting current applied to said electric magnet so that said annular projected portion of said second annular magnetic member to contacts said inside wall of said annular recess of said first annular magnetic member.

3. An improvement in a rotary ring winding device according to claim 2, further comprising means for controlling said exciting current applied to said electric member of said first annular magnetic member in such a manner that said exciting current can be adjusted or the normal direction of said exciting current can be reversed.

4. An improvement in a rotary ring winding device according to claim 2, wherein said bearing device is provided with an annular holding member secured to said ring rail, said first annular magnetic member is coaxially secured to an inside of said holding member, said first annular magnetic member is provided with an annular recess formed at an inside surface thereof, said annular recess is provided with a symmetrical chevron-shaped radial cross section, said first annular magnetic member is divided into two portions as said upper annular portion and said lower annular portion at a peak position of said chevron-shaped radial cross section of said annular recess by an intervening ring made of a non-magnetic substance, said electric magnet is formed in said lower annular portion, said rotary ring member is provided with a lower rotor which is threadingly connected to a lower portion of said annular flange portion thereof, an annular recess is formed between said lower rotor and said annular flange portion at a position where said flange portion is engaged with said lower rotor, said second annular magnetic member is secured in said annular recess formed between said annular flange portion and said lower rotor, said second annular magnetic member is provided with said annular projected portion having a symmetrical chevron shaped radial cross section corresponding to said chevron shaped radial cross section of said first annular recess of said first annular magnetic member, said second annular magnetic member is provided with an annular ring made of a non-magnetic substance at a peak portion of said chevron shaped cross section, whereby said upper annular portion of said first annular magnetic member faces an annular portion above said annular ring of said second annular magnetic member and said lower annular portion of said first annular magnetic member faces an annular portion below said annular ring of said second magnetic member.

5. An improvement in a ring winding device according to claim 4, wherein said annular holding member is provided with a sensing element at a position below said first annular magnetic member and said annular bottom rotor of said rotary ring member is provided with an actuating member at a position below said second annular magnetic member to actuate said sensing element to output a sensing signal indicating the rotation speed of said rotary ring member.

6. An improved rotary ring winding device according to claim 4, wherein said divided lower annular portion of said first annular magnetic member is extended downwards along the axial center thereof with a uniform cylindrical space between said lower rotor of said rotary ring member, an annular yoke case is disposed in said lower annular portion of said first annular magnetic member, a plurality of apertures are extended along said axial center of said bearing device in said yoke case at an axially identical intervened space between two adjacent apertures, and said electric magnet comprises a plurality of component electric magnets deposited in said apertures of said lower portion of said first annular magnetic member, each electric component magnet being excited by an exciting current from outside of said winding device.

7. An improved rotary ring winding device, according to claim 6, wherein one half of said component electric magnets are provided with a circular cross section and the other half of said component electric magnets are provided with a fan-shaped cross section, and said component electric magnets having the circular cross section and said component electric magnets having the fan-shaped cross section are arranged alternately around said axial center of said first annular magnetic member.

8. An improved rotary ring winding device according to claim 6, wherein said bearing device is provided with an annular holding member and said first annular magnetic member is held inside and coaxially of said annular holding member, said first annular magnetic member is formed by a stack of three component annular magnetic members, two annular rings made of a non-magnetic substance magnetically separate these three component annular magnetic members in such a manner that each of these annular ring members is sandwiched by two of said component annular magnetic members, respectively, an intermediate one of said component annular magnetic members having a thinner radial thickness and larger inside diameter than the other component magnetic members so that an annular recess having a rectangular radial cross section is formed between the upper and lower component annular magnetic members, said rotary ring member comprises said annular flange portion and said annular lower rotor threadingly connected to said annular flange portion to form an annular recess having a rectangular radial cross section at said threadingly connected portion, said second annular magnetic member having a rectangular radial cross section is fixed in said annular recess of said rotary ring member while engaging a projected annular portion thereof with said annular recess of said first annular magnetic member with an air space therebetween, whereby an inside annular surface of said intermediate annular component magnetic member of said first annular magnetic member faces an outside circumferential surface of said annular projected portion of said second annular magnetic member, and said lower component annular magnetic member of said first annular magnetic member faces an annular bottom surface of said projected portion of said second annular magnetic member, while said upper component annular magnetic member of said first annular magnetic member faces an annular upper surface of said projected portion of said second annular magnetic member, respectively, said lower component annular magnetic member being formed by an electric magnet.

9. An improved rotary ring winding device according to claim 8, wherein said rotary ring member is provided with a cut-off portion formed at a lower end of said lower rotor and said holding member of said bearing device is provided with a sensing member at a position facing said cut-off portion of said rotary ring member, whereby a rotation of said rotary ring member can be measured by detecting a passing of said cut-off portion of said rotary ring member in front of said sensing member.

10. An improved rotary ring winding device according to claim 6 wherein said component electric magnets are arranged with an identical angular distance between adjacent electric magnets.

11. An improvement in a ring winding device according to claim 4, wherein said inclined recessed surface of said first annular magnetic member and said inclined surface of said second annular magnetic member are coated with a resin material.

12. An improvement in a ring winding device according to claim 4, wherein said annular bottom rotor is provided with a cut-off portion at a bottom end portion thereof and said annular holding member is provided with a sensing element having a function of detecting a passing of said cut-off portion of said annular bottom rotor, whereby the rotation speed of said rotary ring member is detected by said sensing element.

13. An improved rotary ring winding device according to claim 4 wherein said annular holding member is provided with a sensing element having the function of detecting a rotation speed of said annular bottom rotor, said annular bottom rotor being provided with an element to actuate said sensing element whereby the rotation speed of said rotary ring member is detected by said sensing element.

14. An improved rotary ring winding device according to claim 1, wherein said ring rail and said annular flange portion of said rotary ring member are protected from magnetization by said first and second annular magnetic members by a film made of a non-magnetic substance.

* * * * *